No. 654,364. Patented July 24, 1900.
C. SMITH.
CISTERN VALVE FOR WATER CLOSETS.
(Application filed Aug. 30, 1899.)
(No Model.) 2 Sheets—Sheet 1.
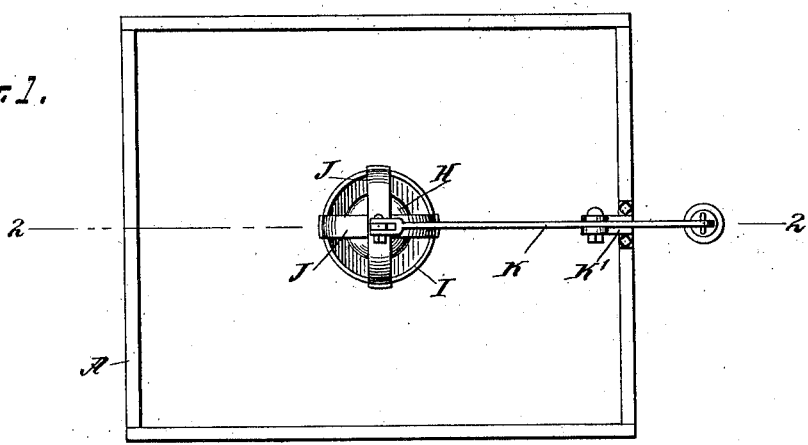
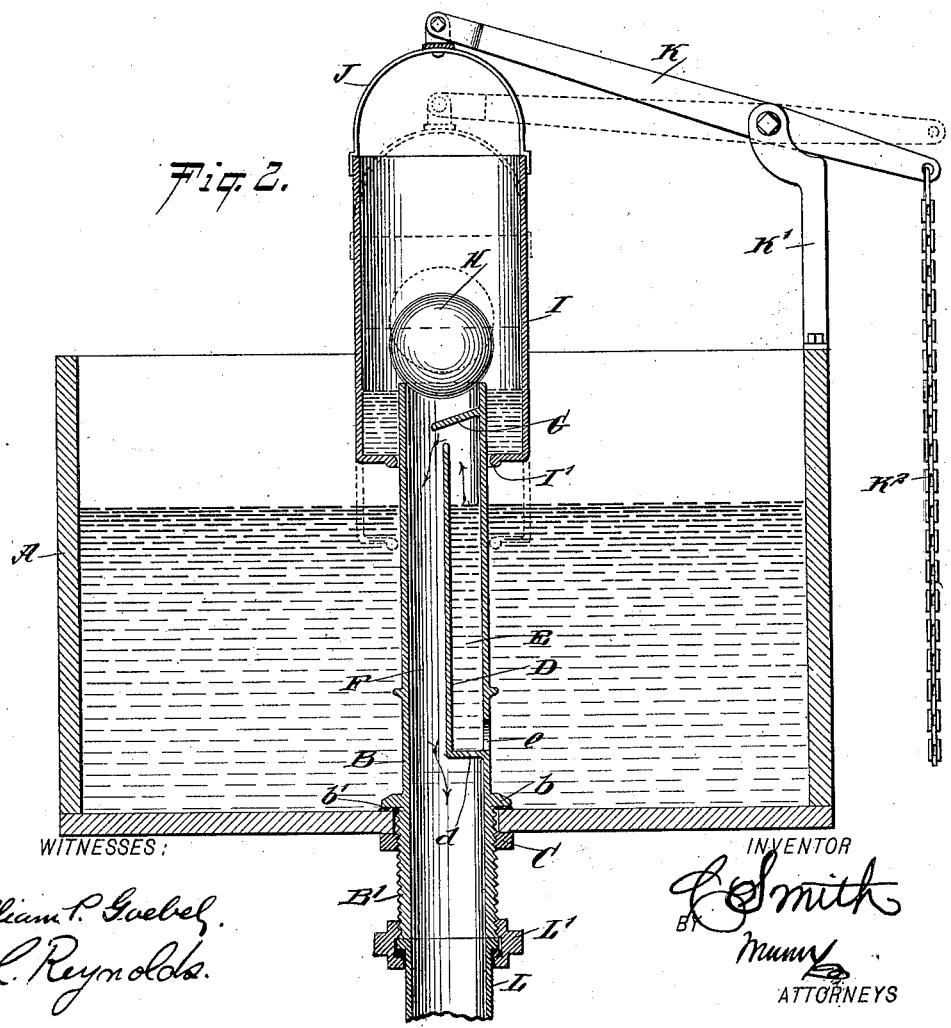
THE NORRIS PETERS CO., PHOTO-LITHO., WASHINGTON, D. C.

No. 654,364. Patented July 24, 1900.
C. SMITH.
CISTERN VALVE FOR WATER CLOSETS.
(Application filed Aug. 30, 1899.)
(No Model.) 2 Sheets—Sheet 2.
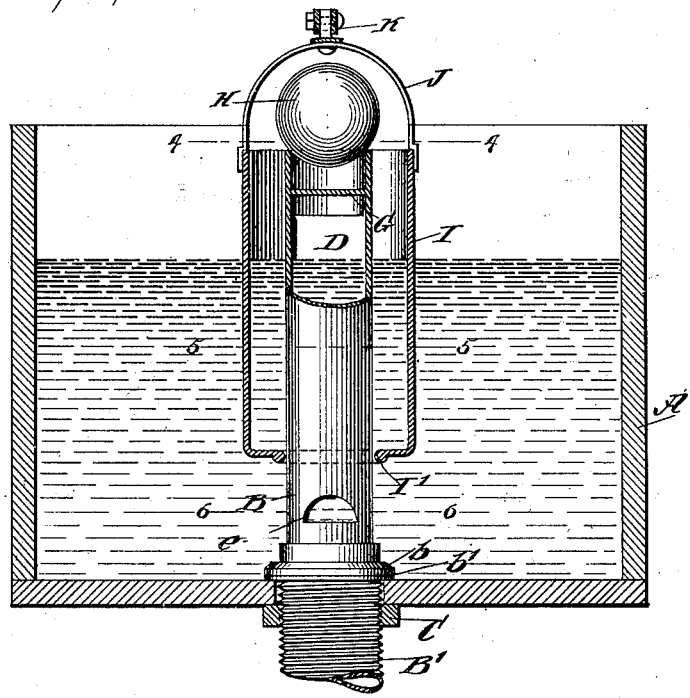
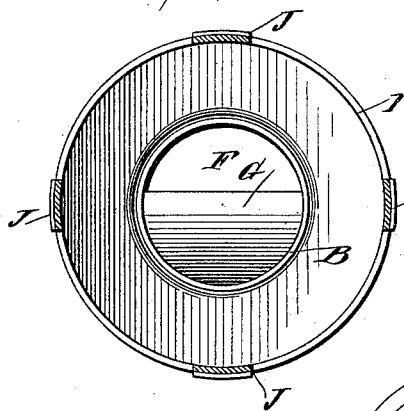
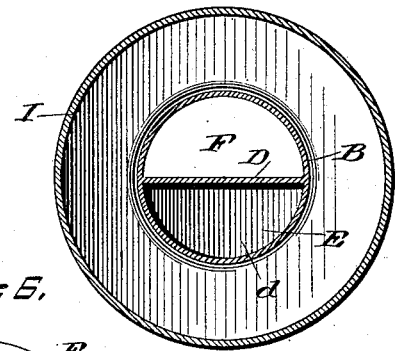
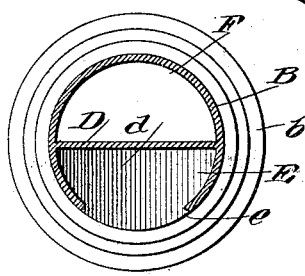
WITNESSES:
William P. Goebel
H. L. Reynolds
INVENTOR
C. Smith
BY
ATTORNEYS

UNITED STATES PATENT OFFICE.

CHARLES SMITH, OF NEW YORK, N. Y.

CISTERN-VALVE FOR WATER-CLOSETS.

SPECIFICATION forming part of Letters Patent No. 654,364, dated July 24, 1900.

Application filed August 30, 1899. Serial No. 729,005. (No model.)

*To all whom it may concern:*

Be it known that I, CHARLES SMITH, of the city of New York, (Far Rockaway,) borough of Queens, in the county of Queens and State of New York, have invented a new and Improved Cistern-Valve for Water-Closets, of which the following is a full, clear, and exact description.

My invention relates to an improvement in cistern-valves for water-closets designed to prevent their leaking and the consequent waste of water.

My invention comprises the novel features hereinafter described and claimed.

Reference is to be had to the accompanying drawings, forming a part of this specification, in which similar characters of reference indicate corresponding parts in all the figures.

Figure 1 is a top or plan view of my device in position in a cistern. Fig. 2 is a sectional elevation upon the line 2 2 of Fig. 1. Fig. 3 is a sectional elevation taken at right angles to that of Fig. 2; and Figs. 4, 5, and 6 are sectional plans taken, respectively, upon the lines 4 4, 5 5, and 6 6 of Fig. 3.

It is a common occurrence with ordinary cistern-valves for water-closets that they will leak more or less, and consequently permit a large quantity of water to flow through them which serves no good purpose. In cases where water is supplied by meter and the water charges are proportioned to the amount of water consumed a very small leakage of this sort will result in largely increasing the water-bill.

The object of my invention is to provide a valve for water-closets which shall absolutely prevent leakage and which will therefore stop the above-mentioned waste of water.

In the drawings the cistern A may be of any suitable or usual form and will of course be provided with the ordinary float and valve for keeping the same filled with water. This float and valve forming no part of my present invention has not been herein shown. Extending upward through the bottom of the cistern is a pipe or tube B, which is provided with a flange $b$, adapted to engage the upper surface of the cistern-bottom, and the lower portion B' of said tube, which projects below the cistern-bottom, is threaded and provided with a clamping-nut C, by means of which a tight joint may be maintained about the tube. To further insure a tight joint, a packing-washer $b'$ may be placed beneath the flange $b$.

The tube B extends a short distance above the normal water-level of the tank or cistern, and within the tube is a vertical partition D, which divides the tube into two parts. The lower portion of the partition D is connected with one side of the tube by means of a lateral extension $d$, and just above this lateral extension is an opening $e$, which communicates with the interior of the tank, said opening constituting the inlet for the water. The upper end of the partition D extends a short distance above the normal water-level of the tank, but stops short of the upper end of the tube B. Above the upper end of the partition D is a transversely-extending partition G, which extends over and covers the upper end of that half E of the tube which is connected with the inlet-opening $e$, said half constituting the suction-leg of a siphon when the device is in operation. This partition G is at a sufficient distance above the top of the partition D to allow ample opening for the water to flow over the top of the partition D when the device is in operation.

A ball H is provided, which is of such size and material as to securely close the upper end of the tube when the same is resting thereon, as shown in Fig. 2. This ball is preferably of rubber and is hollow, so as to be very light and easily raised from its seat when the device is to be put into operation.

Surrounding the tube B is a cup I, which has a hole I' in its bottom of such size as to fit as snugly as may be possible about the tube B and at the same time allow the cup to be readily raised and lowered on said tube. This cup normally will be down about the tube in the position shown in Fig. 3, the water in such case entering through the slight space between the edges of the opening I' and the sides of the tube and filling the cup with water. The cup is provided with two bails J at its upper end, which prevent the possibility of the ball H escaping from the cup. The cup is suspended from a lever K by means of said bails, the lever being pivoted upon the upper end of an arm K', mounted upon the tank, and being operated by means of a chain or cord K² in the usual manner. When the chain K² is pulled, the cup I will be raised, carrying with it the water therein. This water when it reaches the ball H will float the same off of the end of the tube B, and the water in the cup will then be quickly discharged into the upper open end of said tube. This water as it pours into the tube strikes the partition G, which preferably is sloped after the manner shown in Fig. 2, or toward the center of the tube. The water as it pours over the edge of this partition and into the space F, which forms the discharge-leg of the siphon, will draw the air out of the upper end of the space E and cause the water therein to rise until it flows over the top of the partition D. As soon as this happens a siphon is formed which unless broken will empty the water in the tank A down to the level of the inlet-opening e. As soon as the water in the cup I falls to the level of the upper end of the tube B the ball H, which is floating therein, will be seated upon the upper end of the tube. The suction caused thereon by the action of the siphon will serve to hold the ball securely upon the seat, and thus form an air-tight joint. It will be impossible for the ball H to be sucked into the tube any distance, as the partition G extends more than half-way across the tube and is only a short distance below the top of the tube. When the chain K² is released, the cup will fall and gradually settle into the water, being thereby placed in condition for being operated again.

It will be seen that with my device there is no valve placed between the water in the tank and the flushing-pipe L, which must be maintained tight in order to prevent leakage of the water. The only way in which the water can escape from the tank into the flushing-pipe L is either through the inlet-opening e and over the top of the partition D or over the top of the tube B. As the water-level in the tank is normally maintained below both of these points, no leakage can possibly occur unless the siphon is started in operation after the manner described. As soon as the water is lowered to the level of the inlet-opening e air is admitted to the siphon, and the flow of water is thus stopped.

The lower extension B' of the tube B is secured to the flushing-pipe L by means of a union L' or any other suitable means.

Having thus fully described my invention, I claim as new and desire to secure by Letters Patent—

1. A cistern-valve for water-closets, comprising a siphon-tube having its bend extending above the water-level of the cistern, said tube having an open-ended extension above the bend of the siphon and connected with the discharge-leg of the siphon, a ball-valve adapted to seat upon and close the end of said extension, and means for temporarily surrounding and immersing said extension in water, substantially as described.

2. A cistern-valve for water-closets, comprising a siphon-tube having its bend extending above the water-level of the cistern, said tube having an upward open-ended extension connected with the discharge-leg of the siphon, a ball-valve adapted to seat upon and close the end of said extension, a cup surrounding and sliding upon the siphon-tube, and having a water-inlet opening of small area, and means by which the cup may be raised to float the ball and flood the siphon-tube, substantially as described.

3. A cistern-valve for water-closets, comprising a tube connected with a flushing-pipe and extending upward within the cistern to above the water-level thereof, said tube having a central longitudinal partition connected at its lower end with one side of the tube and forming the suction-leg of a siphon, the tube having an inlet-opening into the lower end of the said suction-leg and communicating with the cistern, a transversely-extending partition in the upper portion of the tube and covering the upper end of the suction-leg, a valve adapted to close the upper end of the tube, and means for temporarily flooding the upper end of the tube and thereby raising the valve, substantially as described.

4. A cistern-valve for water-closets, comprising a tube connected with a flushing-pipe and extending upward within the cistern to above the water-level therein, said tube having a central longitudinal partition connected at its lower end with one side of the tube, and forming therewith the suction-leg of a siphon, the tube having an inlet-opening in the lower end of the said suction-leg and communicating with the cistern, a ball-valve adapted to close the upper end of the tube, and means for temporarily flooding the upper end of the tube and thereby raising the valve, substantially as described.

5. A cistern-valve for water-closets, comprising a tube connected with a flushing-pipe and extending upward within the cistern to above the water-level therein, the said tube having a central longitudinal partition connected at its lower end with one side of the tube and forming therewith the suction-leg of a siphon, the tube having an inlet-opening in the lower end of the said suction-leg and communicating with the cistern, a transversely-extending partition in the upper portion of the tube and covering the upper end of the suction-leg, a ball thereon adapted to close the upper end of the tube, a cup surrounding and sliding upon the tube, and means for elevating said cup to float the ball and flood the tube, substantially as described.

CHARLES SMITH.

Witnesses:
JNO. M. RITTER,
H. L. REYNOLDS.